(No Model.)
W. F. CASSEDY.
PIPE OR HOSE COUPLING.
No. 263,855. Patented Sept. 5, 1882.
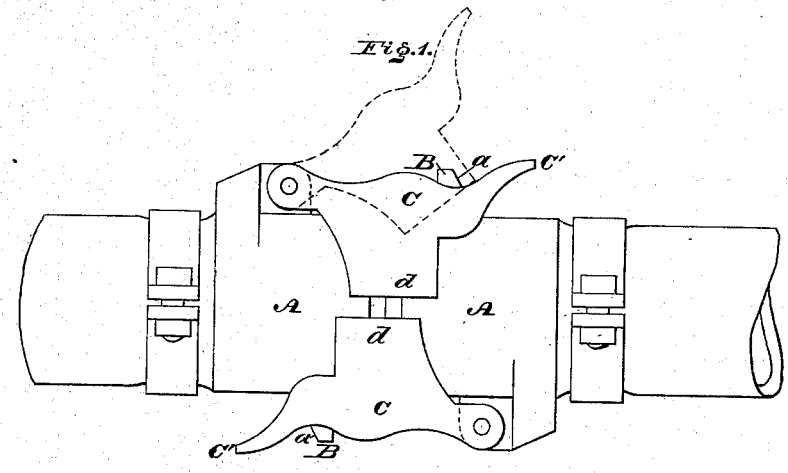
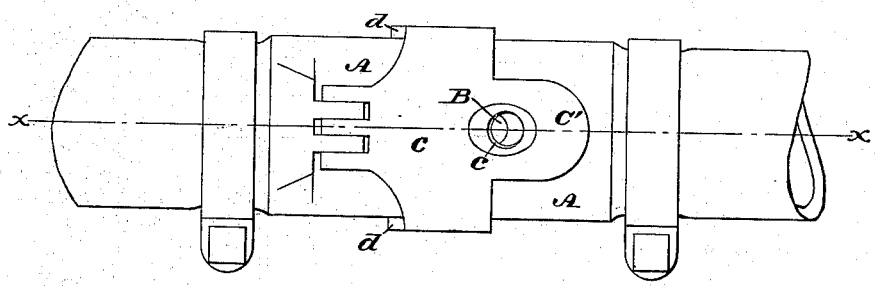
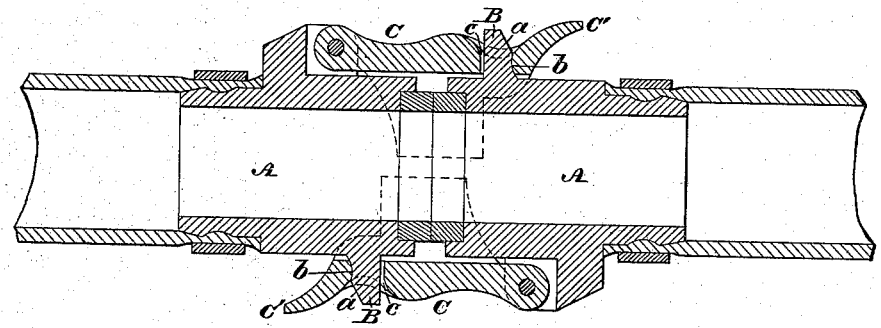
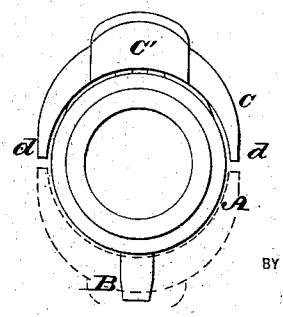
WITNESSES:
INVENTOR:

UNITED STATES PATENT OFFICE.

WILLIAM F. CASSEDY, OF CAPE MAY, NEW JERSEY, ASSIGNOR OF ONE-HALF TO ENOS R. WILLIAMS, OF SAME PLACE.

PIPE OR HOSE COUPLING.

SPECIFICATION forming part of Letters Patent No. 263,855, dated September 5, 1882.

Application filed April 26, 1882. (No model.)

*To all whom it may concern:*

Be it known that I, WILLIAM F. CASSEDY, a citizen of the United States, residing at Cape May city, in the county of Cape May, State of New Jersey, have invented a new and useful Improvement in Pipe or Hose Couplings, which improvement is fully set forth in the following specification and accompanying drawings, in which—

Figure 1 is a side elevation of the pipe or hose coupling embodying my invention. Fig. 2 is a top or plan view thereof. Fig. 3 is a longitudinal section in line $x\ x$, Fig. 2. Fig. 4 is an end view thereof.

Similar letters of reference indicate corresponding parts in the several figures.

My invention consists of a coupling which operates with a wedging effect, thus forcibly drawing together and firmly holding sections of pipe or hose, and has other features, the construction and operation being hereinafter fully set forth.

Referring to the drawings, A represents collars at the ends of adjacent lengths of pipe or hose to be coupled.

B represents a stud, which projects radially from the exterior of each collar, and has the side which faces the pipe or hose inclined, as at $a$, and notched, as at $b$, forming a nose.

C represents a coupling-clamp, which is hinged to the collar on the side opposite to the stud B, and has an opening, $c$, which is adapted to receive the stud of the adjacent collar, it being noticed that the clamp is of such length that it overlaps the end of the adjacent collar, and has its end formed with an outwardly-projecting finger or prying piece or horn, $C'$.

The operation is as follows: A suitable gasket is placed between the two pipes or sections of hose to be coupled or fitted on the ends thereof, and the stud of one collar inserted into the opening of the clamp of the other collar, thus locking said stud and clamp. The other clamp is then swung over on the opposite collar and forced down thereagainst. In this motion the wall of the opening of said clamp strikes the nose or inclined side or face $a$ of the stud B and rides thereon, thus acting with a wedging effect to draw the clamp forward and force the collars firmly against each other, the gasket being powerfully compressed and a close and tight joint produced. As soon as the wall of the opening $c$ reaches the notch $b$ it drops thereinto after the manner of a snap, whereby the collars are prevented from separating and a reliable coupling is produced. When the pipe or hose is to be uncoupled either clamp is forced away from the engaging stud, thus disconnecting them, the power being applied to the piece $C'$, and the other clamp and stud having no hold, one on the other separate, whereby the operation of uncoupling has been accomplished in a rapid and convenient manner.

The sides of the clamp are extended, as at $d$, so that the shape of the clamp in cross-section is semi-cylindrical, and the extensions of the two clamps embrace the collars, forming a cylindrical guard at the joint, which prevents the edge of the clamps being exposed. The pipe or hose may rest on the sides of the clamps without ability of the latter to be forced from their locking position with the studs B, and when it rests on the lower clamp there is no liability of said clamp disengaging itself from the stud, and thus the coupling of the pipe or hose is assured. The end or horn $C'$ of each clamp extends outwardly beyond the stud B and protects the latter. When a weight is laid on the pipe at the joint it will bear on the horn $C'$ of the upper coupling and hold said coupling down. The weight of the pipe will in like manner force the lower horn $C'$ against the ground and lock the lower clamp. When the pipe is drawn in the direction opposite to the inclination of the lower horn the effect will be the same. The side pieces, $d$, give each of the clamps the shape of a saddle, so that the two clamps together cover nearly the whole circumference of the collars.

Having thus described my invention, what I claim as new, and desire to secure by Letters Patent, is—

1. A hinged clamp constructed with an opening, $c$, and provided with side pieces, $d$, whereby it is enabled to inclose the sides as well as the top of the coupling, in combination with a collar having a stud over which said clamp catches, substantially as and for the purpose set forth.

2. The two collars A A, each having a stud, B, in combination with hinged clamps C, having openings c and horns C', which latter project beyond the studs B, with which the clamps interlock, substantially as and for the purpose set forth.

3. The two collars A A, each having a stud, B, provided with an incline, a, in combination with hinged clamps C, which are shaped so as to inclose nearly the entire circumference of said collars, the clamps being provided with openings c and horns C', which latter project beyond the studs B, with which the clamps interlock, substantially as and for the purpose set forth.

W. F. CASSEDY.

Witnesses:
FRANCIS K. DUKE,
WALTER S. WARE.